United States Patent [19]

Chapman

[11] Patent Number: 4,980,846
[45] Date of Patent: Dec. 25, 1990

[54] PROCESS AND APPARATUS FOR CONTROLLING ON-LINE A PARAMETER OF A MOVING SHEET

[75] Inventor: Edward W. Chapman, Hamlin, N.Y. 14464

[73] Assignee: Impact Systems, Inc., San Jose, Calif.

[21] Appl. No.: 178,720

[22] Filed: Apr. 7, 1988

[51] Int. Cl.$^5$ .................... G06F 15/46; G01N 5/02
[52] U.S. Cl. ................... 364/550; 364/563; 364/474.09; 73/73
[58] Field of Search ............... 364/550, 563, 551.01, 364/474.09, 200, 900; 73/73–77; 324/61 R, 65 R, 635, 644, 662, 716

[56] References Cited

U.S. PATENT DOCUMENTS

| | | | |
|---|---|---|---|
| 3,801,426 | 4/1974 | Putman et al. | 73/75 X |
| 3,813,927 | 6/1974 | Furgason | 73/73 |
| 3,823,371 | 7/1974 | Lippke | 73/73 X |
| 4,313,899 | 2/1982 | Hain | 73/73 X |
| 4,346,439 | 8/1982 | Huno et al. | 364/200 |
| 4,346,446 | 8/1982 | Erbstein | 364/551.01 |
| 4,455,620 | 6/1984 | Watanabe et al. | 364/900 |
| 4,458,313 | 7/1984 | Suzuki et al. | 364/200 |
| 4,471,427 | 9/1984 | Harris | 364/200 |
| 4,484,273 | 11/1984 | Stiffler et al. | 364/200 |
| 4,506,969 | 3/1985 | Baker | 364/563 X |
| 4,546,444 | 10/1985 | Bullis | 364/550 |
| 4,616,337 | 10/1986 | Sheth | 364/900 |
| 4,620,279 | 10/1986 | Read et al. | 364/200 |
| 4,633,420 | 12/1986 | Masanobu | 364/563 |
| 4,674,325 | 6/1987 | Kiyobe et al. | 73/73 |
| 4,707,834 | 11/1987 | Frisch et al. | 364/200 |
| 4,748,400 | 5/1988 | Typpo | 324/61 R |
| 4,752,895 | 6/1988 | Sarr | 364/550 |
| 4,752,897 | 6/1988 | Zoeller et al. | 364/550 |
| 4,777,610 | 10/1988 | Barwick et al. | 364/563 |
| 4,847,750 | 7/1989 | Daniel | 364/200 |
| 4,878,166 | 10/1989 | Johnson et al. | 364/200 |

FOREIGN PATENT DOCUMENTS 1037293  8/1983  U.S.S.R. .................... 364/563

OTHER PUBLICATIONS

"Interrupts, Direct Memory Access and Processes", pp. 340–343, Jan. 1987.

Primary Examiner—Joseph L. Dixon
Attorney, Agent, or Firm—Flehr, Hohbach, Test, Albritton & Herbert

[57] ABSTRACT

In a process for controlling on-line a parameter of a moving sheet, scan data from a cross direction scanning sensor (for example, for moisture) is retrieved from a memory while the sensor reverses direction at a turnaround point. This is accomplished by utilizing the direct memory access (DMA) capability of the existing computer system and plugging into the existing address, data and DMA bus of that system a printed circuit board which halts normal computer operation for minimum periods so as not to interfere with its operation.

3 Claims, 4 Drawing Sheets

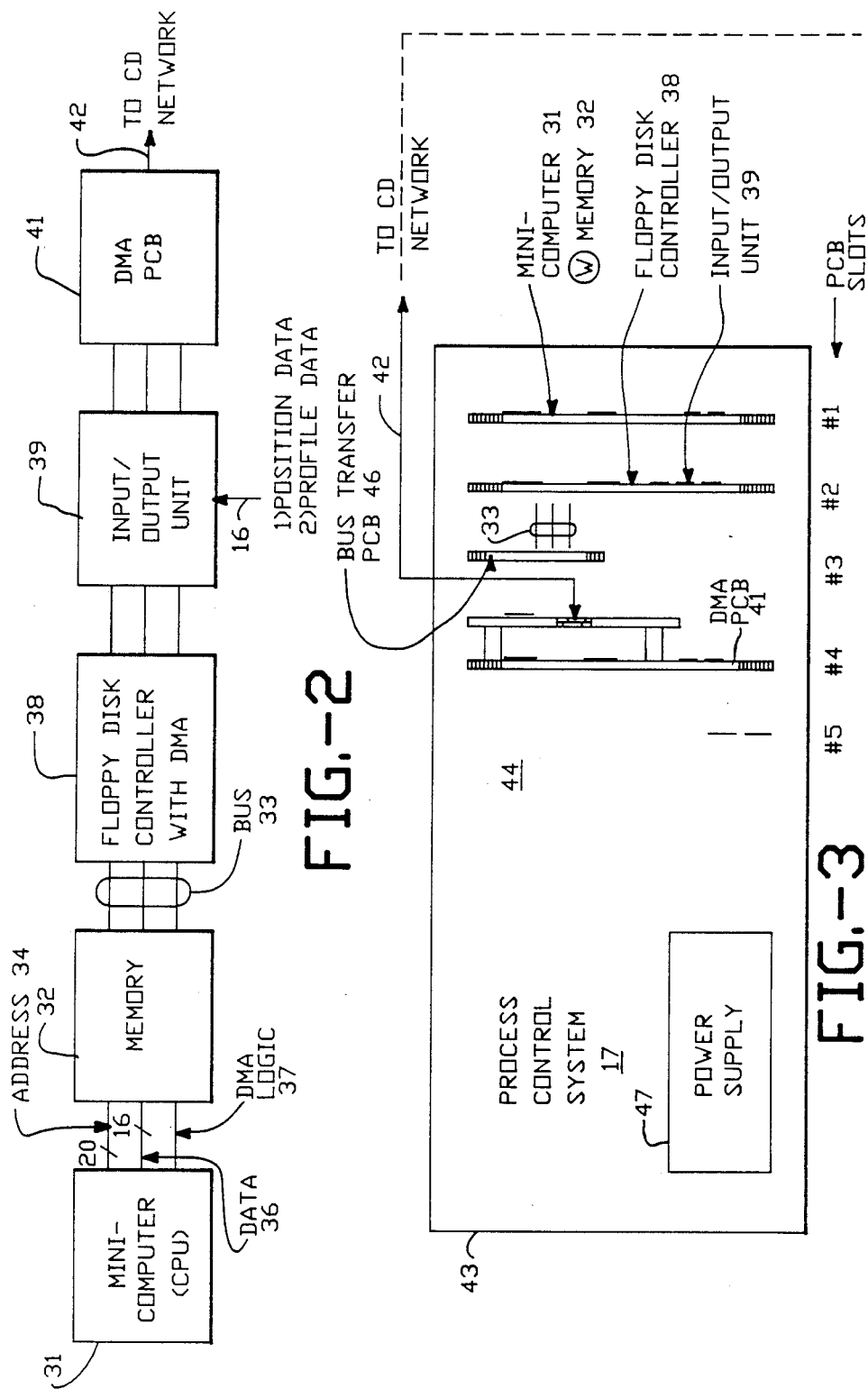

PROCESS AND APPARATUS FOR CONTROLLING ON-LINE A PARAMETER OF A MOVING SHEET

BACKGROUND OF THE INVENTION

The present invention is directed to a process for controlling on-line a parameter of a moving sheet and more specifically to efficiently interfacing with an existing process control system.

When a computer control system is being utilized to monitor, for example, the characteristic of a moving sheet of paper (such characteristics including moisture, basis weight or caliper), it is desired to utilize this monitored information to control what is known as an actuator in the paper making industry to control the parameter to a desired set point. Since data is normally acquired with the moving sheet by scanning across the sheet and scans are sequentially taken, there is a huge amount of data which the computer control system must acquire and process.

It is important that the actuator, which in the end will utilize the acquired data or monitored parameter, should not interfere with such monitoring. Of course the software of the computer control system which is monitoring the parameter can be modified to expedite the transfer of appropriate data but this may be difficult or undesirable in many circumstances.

OBJECTS AND SUMMARY OF THE INVENTION

It is therefore a general object of the present invention to provide an improved process and apparatus therefor for controlling on-line a parameter of a moving sheet.

In accordance with the above object there is provided in a system for treating a moving sheet sensing means, including a scanner for scanning across the sheet, for monitoring the parameter of the sheet and providing a train of data for each scan. The sensing means includes a central processing unit (CPU) with a memory for storing the train of data. The CPU also has a bus with address, data, and direct memory access (DMA) portions. Actuator means are responsive to the train of data for controlling the parameter of the sheet. Printed circuit board (PCB) means is plugged into the bus for linking the memory of the CPU to the actuator means. The PCB means includes means for placing the CPU in a DMA state during which the CPU is prevented from intervening in the readout of the data from memory.

BRIEF DESCRIPTION OF THE DRAWINGS

FIG. 2 is a detailed block diagram of the process control system of FIG. 1, FIG. 3 is a physical representation in elevation view format of printed circuit boards utilized in the process control system of FIG. 2.

DETAILED DESCRIPTION OF PREFERRED EMBODIMENT

Figure 1:
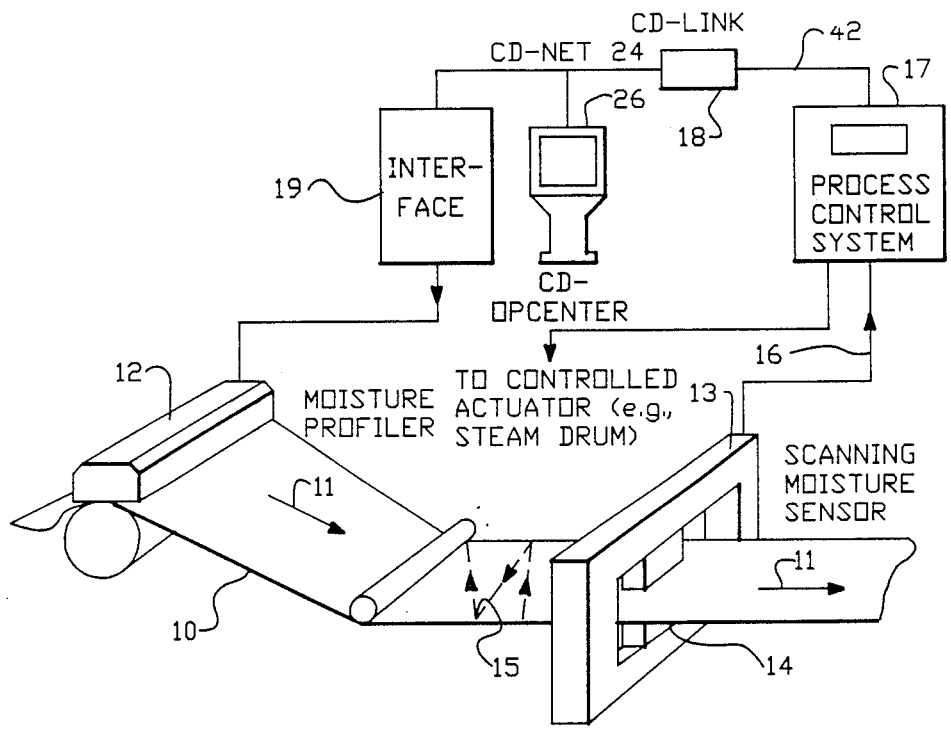
FIG. 1 is a block diagram showing the overall system with which the present invention is used.

In the preferred embodiment illustrated in FIG. 1 an object is to control the moisture in the various slices or zones of the paper 10 being manufactured by a paper making machine which is moving in a machine direction indicated by the arrows 11. The invention of course also has applicability to other parameters of paper making including basis weight and caliper and in fact with on-line control of other processes where large amounts of information are being generated.

As is well known in the paper making process, to remove for example moisture streaks which may commonly occur in the machine direction a moisture profiler 12 is utilized which consist of a series of heating modules with quartz heating elements.

Furthermore, a typical way of measuring the moisture parameter is by the use of a scanning moisture sensor 13 which includes a pair of scanning heads 14 which, for example, every thirty seconds scan in a cross direction across the paper (perpendicular to machine direction 11), make a turnaround and scan in the opposite direction. Such scanner 14 in essence forms a zigzag pattern of scans shown at 15. (These scans of course would occur after or downstream of sensor 13.) The moisture sensor 13 provides by the use of a pair of infrared light beams in a manner well known the sequential measurement of the moisture value of each zone or slice. Thus it provides a train of data for each scan at a fairly high data rate. Moreover as shown at 15 the scanning is continuous since it is important to update the moisture profiler 12 within a few seconds.

The outputs of the scanning moisture sensor 13 are on line 16 and normally consist of both the parameter data (in this case, moisture profile data) and position data as to where the scanner is located across the paper sheet. These locations at least in the paper making art are termed slices. This term will be used in the present invention but is meant to encompass any sequential acquisition of data. Then the data line 16 is coupled to a process control system 17 and then via a cross direction link 18 to the cross direction network 24 and further to the interface unit 19 to drive the moisture profiler 12. A steam drum (not shown) would also be controlled. Finally an operation center 26 is connected to the CD network 24.

FIG. 2 illustrates in block diagram form process control system 17 of FIG. 1. It includes a mini or a microcomputer 31 which in the present embodiment might be manufactured by Digital Equipment Corporation (DEC) as the model LSI11 or the Measurex Vision ET. Such a computer has an associated memory 32 contained on essentially the same printed circuit board (PCB) and a bus 33 with an address portion 34 (in the case of the LSI11 of 20 bits), a data portion 36 (in the case of the LSI11 of 16 bits), and a direct memory access (DMA) logic portion 37.

Such DMA bus portion operates in a well known manner to prevent the processor 31 from reading or writing to memory 32 or intervening in the readout of the memory by, for example, another device plugged into the bus 33 (which is the computer's information highway). These other devices in a typical process control system are as illustrated a floppy disk controller 38 and an input/output unit 39. The latter is directly connected to line 16 from the moisture scanning sensor as illustrated in FIG. 1. As also indicated this data line contains both position data and profile data. Such data, when communicated to the I/O unit 39 by the use of DMA (if necessary), can be communicated to memory 32 directly without active intervention of processor or minicomputer 31. All of the units 38 and 39 and memory 32 portion are plugged directly into bus 33.

Normally a DMA operation is needed to transfer large amounts of data between the memory 32 and an input or output device such as a disk drive controller. Software is normally implemented to effectuate said transfer. In other words the minicomputer or central processing unit (CPU) 31 will recognize when the DMA process is taking place and for what purpose and thus will have structured its operations with respect to data memory 32, for example, not to interfere during the DMA operation.

To avoid making the foregoing software modification, there is plugged into the bus 33 an added printed circuit board 41 which is designated DMA-PCB because it utilizes the DMA function available in conjunction with minicomputer 31 to retrieve information from memory 32 without any needed software modification. The output of the DMA PCB 41 on line 42 is connected to the cross direction link 18 and eventually the cross direction network 24 as illustrated in FIG. 1. From a practical point of view, PCB 41 in the preferred embodiment may include a microprocessor available from for example Intel Corporation as model 8086 and a "bit bus card" for a translation of bit information from the format of minicomputer 31 to the needed format of the moisture profiler 12.

From a physical standpoint process control system 17 is illustrated in FIG. 3 where there is actually an electronics equipment box 43 shown in elevation view which has at least five printed circuit board slots so numbered. The electronics box 43 contains the bus 33 into which the various printed circuit boards are plugged which, in essence, extends along the rear 44 of the unit 43. In the first PCB slot is the minicomputer 31 with memory 32 as an integral portion. Next the floppy disk controller 38 which is effectively the top half of the printed circuit board with the input output unit 39 being the lower half. Then the DMA printed circuit board 41 is plugged into slot 4. There is an extra PCB slot 3 left vacant because of the thickness of PCB 41. Thus, a bus transfer PCB 46 is plugged into slot 3 which in effect makes the bus 33 continuous. Finally there is of course a power supply 47 for the process control system.

Figure 4:
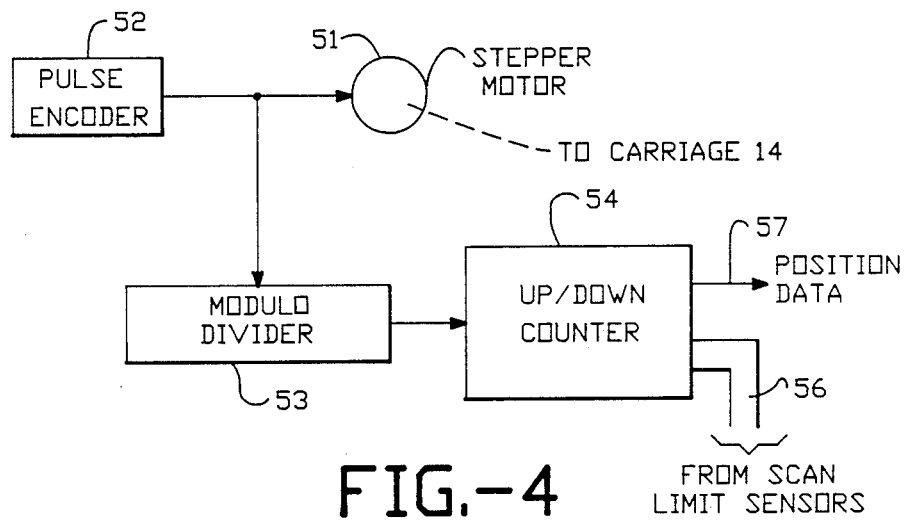
FIG. 4 is a block diagram showing the operation of a portion of FIG. 1, FIGS. 5A and 5B are portions of a memory which is part of the process control system shown in FIG. 2.

FIG. 4 illustrates the equipment essentially contained in the moisture scanning sensor unit 13 to provide position data to the input output unit 39. Carriage 14 is driven by a stepper motor 51 which is stepped by a proper sequence of pulses from pulse encoder 52. The faster the pulses the faster the stepper motor steps. These pulses are divided by a modulo divider unit 53 which drives an up-down counter 54 which thus at any one time contains information regarding the relative position of the scanner 14. Such scanner scans from a low scan limit on the left as one views FIG. 1 to a high scan limit.

Figures 5A, 5B:
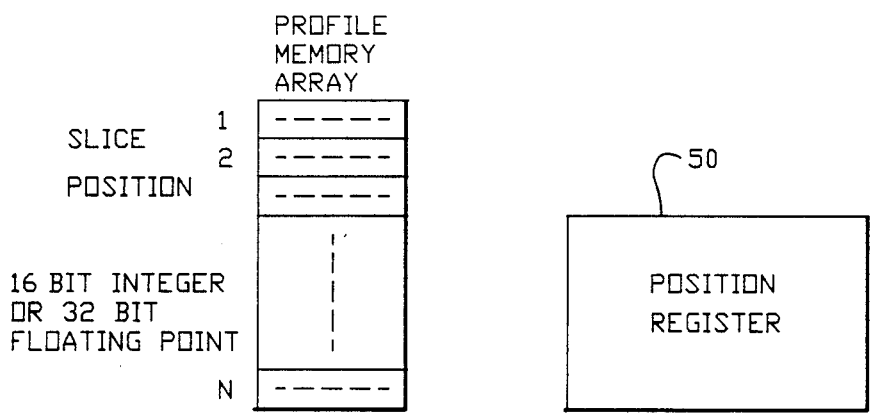

Built into moisture sensor 13 are scanning limit units which input on the line pair 56 to tell the up-down counter 54 when to reverse itself. Thus the position data on line 57 which is in effect part of the input line 16 of I/O unit 39 instructs the counter when to reverse its count. Monitoring of this position data thus allows the user to know which slice the scanner is located at that data acquisition moment. Also, monitoring the position data on line 57 determines the turnaround points. Both position data and profile data on the data output line 16 (see FIG. 1) are processed by input output unit 39 as illustrated in FIG. 2 and stored in memory 32. The memory portions are illustrated in FIG. 5A which is the profile memory array which contains a memory location for each slice position. FIG. 5B illustrates a position register which may merely contain the momentary position data from output 57 of the up-down counter 54. As indicated in FIG. 5A in the specific case of an LSI11 type DEC computer the profile information (which might actually be the amount of moisture in that slice of the moving sheet) could be in the form of a 16 bit integer or a 32 bit floating point word. Thirty-two bits utilizes two levels of the memory. Finally, in this specific case of the LSI11 DEC computer, operation is actually on an 8 bit basis when data is being transferred by the CPU 31 into the memories of FIG. 5A or FIG. 5B.

Figure 6:
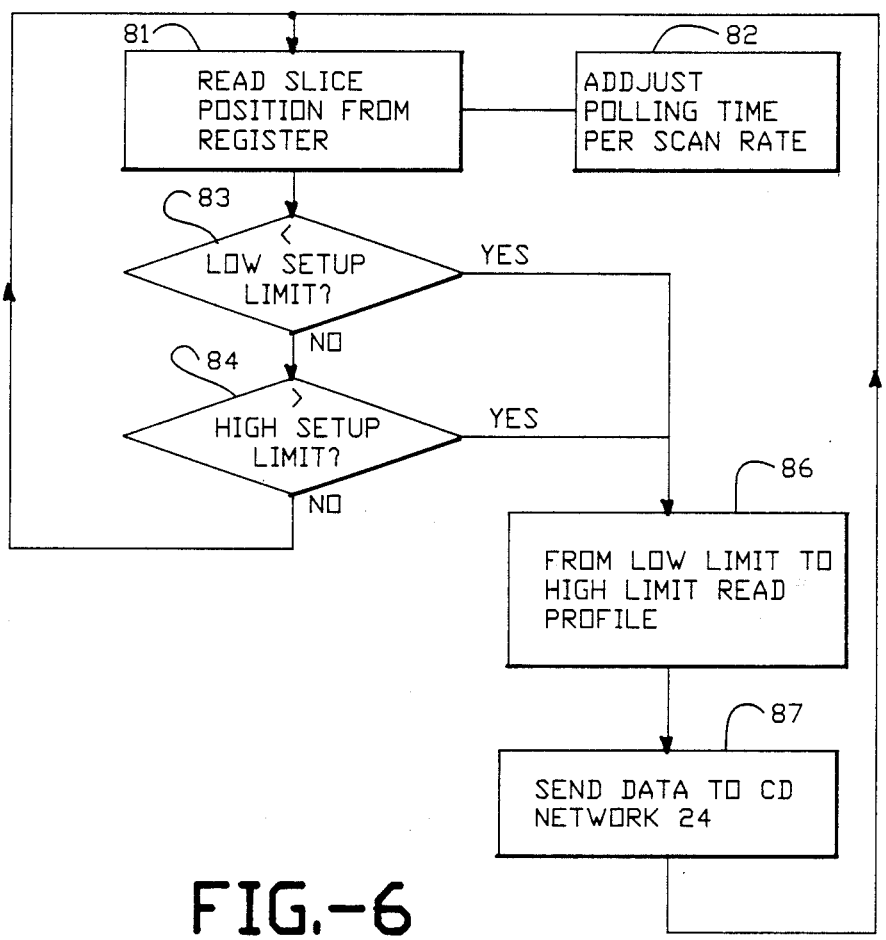
FIG. 6 is a flowchart showing a software program utilized in the present invention.

FIG. 6 illustrates how the train of data for a particular scan is retrieved or read. In step 81 first the high or low turnaround point must be determined. Thus, the slice position is read from the position register 50 in FIG. 5B. Since the scanner 14 may operate at various scan rates or speeds, depending on the width of the paper sheet 10, reading of the slice position can be adjusted so it is polled at an effective rate as indicated by the step 82. However, this is not critical. Normally the up-down counter 54 (FIG. 4) which monitors the slice position will have unused slice positions (or rather irrelevant slice positions) when the scanner in effect goes off the sheet both at the left and right edges. It might parenthetically be mentioned that these off sheet positions from a practical standpoint are used for standardization of the infrared sensors. Thus for example assuming 100 slice positions possible on up-down counter 54 only positions 3 through 97 might be used. Thus stored in the computer are a low setup limit of for example 3 and a high setup limit of 97. By monitoring the position register 50 it is obvious that if the contents of position register are less than the low setup limit as illustrated in step 83 or greater than the high setup limit as illustrated in step 84 that a turnaround point has been reached. Since at this point all of the profile data has been stored in the profile memory array of FIG. 5A step 86 dictates that this profile array be read. This memory contains all of the parameter data which is a train of data for a particular scan. Thereafter this data as indicated in step 87 is sent to the CD network 24 via the line 42 of the DMA PCB as shown in FIGS. 2 and 3. The reason for reading the profile memory array of FIG. 5A in this turnaround period of time is that the stored information is overread by the next scan. See the zigzag scan 15 of FIG. 1.

In order not to interfere with the operation of the monitoring of the data performed by minicomputer 31 timing is critical so as not to place the minicomputer's processor in the DMA state for time periods that would substantially interfere with its data acquisition operation or other usual functions such as the control of an actuator such as a steam drum, as discussed above. This is one problem. Another is that in view of the 8 bit data transfer of the particular minicomputer if the CPU 31 is updating data in memory 32 when the DMA device reads the memory, half new and half old data could be transferred. Thus, a multiple reading comparison technique is provided which removes the above uncertainty and restores data integrity.

Figure 7:
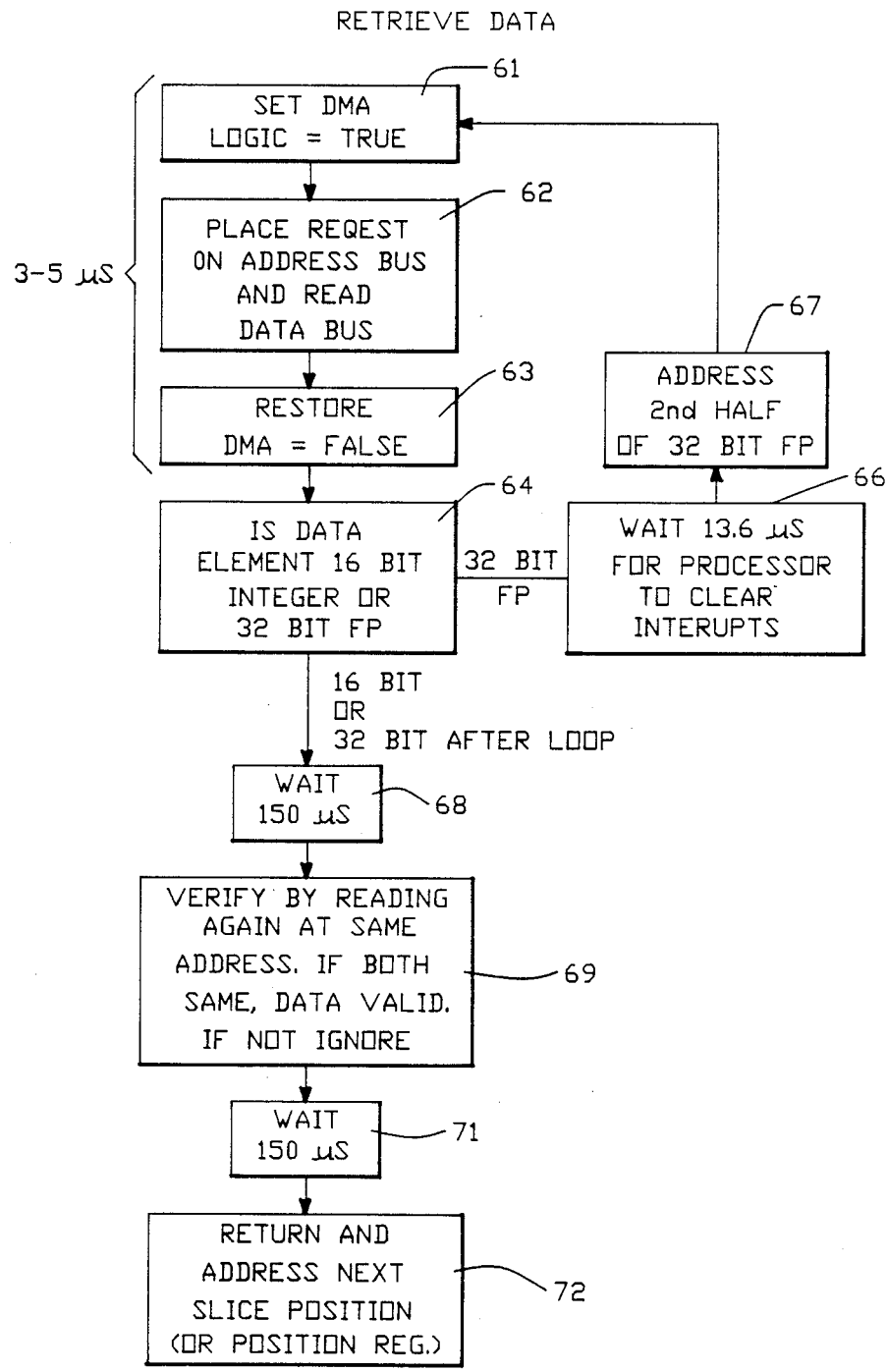
FIG. 7 is a more detailed flowchart in essence being a subroutine for portions of FIG. 6.

The specific technique to retrieve data is illustrated in FIG. 7 and as shown in step 61 the first step is to set the DMA logic bus true to thus prevent the CPU 31 from interfering in the data reading operation. Next, in step 62 an address of the particular low end of the profile memory array (FIG. 5A) is placed on the address bus (that is nominally slice position one), and this information is read on the data bus. Step 63 indicates the DMA is restored to false thus allowing the central processing unit to resume operation. Steps 61 through 63 take approximately 3 to 5 microseconds.

This is a minimum cycle time of the particular CPU 31. By the use of this cycle time and then waiting a substantially longer period before the next element of data is retrieved allows the CPU 31 to efficiently perform functions such as servicing interrupts. In other words, normal operation of the CPU is not interfered with.

In order to retrieve the two types of information in the profile memory array of FIG. 5A, that is 16 bit integer or 32 bit floating point, step 64 provides for a second access or retrieval of the other half of the 32 bit floating point memory after a 13.6 microsecond wait as indicated in step 66. This wait, as discussed above, is necessary for the processor to clear immediate interrupts. Then as indicated in step 67 the second half of the 32 bit floating point data is addressed and obtained. After moisture data for the initial slice has been gotten, for example, a wait of 150 microseconds is determined by step 68. Again this relatively long time compared to the 3 to 5 microsecond cycle time of this particular computer ensures that the CPU 31 operation is not interfered with.

The other critical aspect of timing as discussed above is that the data must be verified to ensure that the CPU 31 has not, between retrieval of portions of the data, changed it. Thus, step 69 provides that the same data is read again at the same address. If they compare as the same then the data is valid. If not it is ignored. These steps thus have achieved access of one slice of data. The process continues as indicated in step 71 with another wait of 150 microseconds and a return is made as indicated in step 72 at the next slice position address. The same steps in FIG. 7 are also utilized and as indicated in step 72 to acquire the position register information to determine whether a low setup limit or high setup limit (see steps 83 and 84 in FIG. 6) have been reached.

Thus the present invention has provided for accessing a train of data from an operating process control computer system by merely inserting an additional printed circuit board 41 with no necessary changes in the operating software.

Such data has been illustrated as cross directional (CD) moisture data for a moving sheet but may include caliper, various weights such as basis, dry, ash, coat—and any other scanning information. Other one element no scanning measurements can be picked up at will, and processed as engineering units as needed, for example, time of day, steam pressure, stock flow.

What is claimed:

1. A process for controlling on-line at least one parameter of a moving sheet having a plurality of slice positions across its width, data related to said at least one parameter for each slice being determined by repetitive cross-direction scanning of a sensor across said sheet, said sensor being carried by a scanner having a low scan limit and a high scan limit which are turnaround points for the scanner, said sensor being a part of an existing process control computer system for controlling another parameter of said sheet also related to said data which also includes a central processing unit (CPU) having a predetermined minimum cycle time, a memory for storing scan parameter data from said sensor for each slice position, and an input/output unit for receiving said data from said sensor and also for controlling said another parameter of said moving sheet under control of said CPU and said data stored in said memory, said existing process control computer having a bus with address, data, and direct memory access (DMA) portions, which interconnects said CPU, said memory, and said input/output unit, said input/output unit under control of said CPU acquiring said data and transmitting it via said bus to said memory, said process comprising the following steps:

permanently inserting a printed circuit board (PCB) into electrical contact with all portions of said bus;

and thereafter retrieving under control of said PCB at least a portion of said data immediately after being stored in said memory including the step of accessing such data from said memory by setting said DMA bus portion TRUE for substantially the minimum cycle time of said CPU, such retrieving being transparent to said CPU;

thereafter waiting a substantially longer time until the next retrieving of a portion of said data, said longer time being independently determined under control of said PCB to allow several cycles of operation of said existing process control computer so as not to slow its processing time;

and utilizing such data for controlling said at least one parameter of said sheet.

2. A process as in claim 1 where all of said data for a particular scan is retrieved within the time required for said scanner to turn around.

3. A process as in claim 1 where data is of the floating point type and including the step of verifying such data by accessing such data twice and comparing.

* * * * *